US011210508B2

(12) United States Patent
Miller et al.

(10) Patent No.: US 11,210,508 B2
(45) Date of Patent: Dec. 28, 2021

(54) ALIGNING UNLABELED IMAGES TO SURROUNDING TEXT

(71) Applicant: International Business Machines Corporation, Armonk, NY (US)

(72) Inventors: Suzanne Miller, South Riding, VA (US); Renee F. Decker, Brunswick, MD (US); Charles E. Beller, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/736,020

(22) Filed: Jan. 7, 2020

(65) Prior Publication Data
US 2021/0209353 A1 Jul. 8, 2021

(51) Int. Cl.
*G06F 40/169* (2020.01)
*G06K 9/00* (2006.01)
(Continued)

(52) U.S. Cl.
CPC ..... *G06K 9/00456* (2013.01); *G06F 16/3331* (2019.01); *G06F 16/35* (2019.01); *G06F 16/383* (2019.01); *G06F 40/103* (2020.01); *G06F 40/134* (2020.01); *G06F 40/205* (2020.01); *G06F 40/30* (2020.01); *G06K 9/623* (2013.01);
(Continued)

(58) Field of Classification Search
CPC .... G06F 16/35; G06F 16/383; G06F 16/3331; G06F 40/134; G06F 40/103; G06F 40/205; G06F 40/30; G06F 40/169; G06F 16/5846; G06F 16/94; G06F 16/9558; G06K 9/00456; G06K 9/00671; G06K 9/00684; G06K 9/6215; G06K 9/6266; G06K 9/6268; G06K 9/623; G06K 2009/00489
See application file for complete search history.

(56) References Cited

U.S. PATENT DOCUMENTS 5,845,288 A * 12/1998 Syeda-Mahmood ... G06F 16/58
7,689,539 B2 * 3/2010 Sjoblom ................ G16H 30/20
707/999.002

(Continued)

OTHER PUBLICATIONS

Poco et al., "Reverse-Engineering Visualizations: Recovering Visual Encodings from Chart Images", Eurographics Conference on Visualization (EuroVis) 2017 J, vol. 36 (2017), No. 3, 11 pps., <https://idl.cs.washington.edu/files/2017-ReverseEngineeringVis-EuroVis.pdf>.

*Primary Examiner* — Wilson W Tsui
(74) *Attorney, Agent, or Firm* — David K. Mattheis; Maeve M Carpenter

(57) ABSTRACT

Aspects of the present invention disclose a method for extracting information of an unlabeled image within a document and aligning the information to text of the document. The method includes one or more processors identifying an image that is not associated with a corresponding label in a document that includes text. The method further includes determining a feature of an object of the image. The method further includes identifying an alignment candidate of the text of the document based at least in part on the feature of the object, wherein the alignment candidate is a segment of the text of the document identified as corresponding to the feature of the object. The method further includes aligning the feature with the alignment candidate of the text of the document.

20 Claims, 6 Drawing Sheets

(51) Int. Cl.
*G06K 9/62* (2006.01)
*G06F 40/103* (2020.01)
*G06F 40/30* (2020.01)
*G06F 40/205* (2020.01)
*G06F 16/33* (2019.01)
*G06F 16/383* (2019.01)
*G06F 16/35* (2019.01)
*G06F 40/134* (2020.01)

(52) U.S. Cl.
CPC ......... *G06K 9/6215* (2013.01); *G06K 9/6259* (2013.01); *G06K 9/6268* (2013.01); *G06K 2009/00489* (2013.01)

(56) References Cited

U.S. PATENT DOCUMENTS

| | | | |
|---|---|---|---|
| 8,255,786 B1* | 8/2012 | Gattani | G06F 16/9558 715/205 |
| 9,047,283 B1* | 6/2015 | Zhang | G06F 40/205 |
| 9,384,408 B2* | 7/2016 | Everingham | G06K 9/325 |
| 9,588,950 B2* | 3/2017 | Kramer | G06F 40/169 |
| 10,248,662 B2 | 4/2019 | Wu | |
| 2003/0076344 A1* | 4/2003 | Chatani | G06F 3/0482 715/711 |
| 2007/0047813 A1* | 3/2007 | Simske | G06K 9/6292 382/176 |
| 2014/0149407 A1* | 5/2014 | Qian | G16H 15/00 707/737 |
| 2014/0212038 A1* | 7/2014 | Dejean | G06K 9/00463 382/176 |
| 2014/0280353 A1* | 9/2014 | Delaney | G06F 16/367 707/794 |
| 2015/0278253 A1 | 10/2015 | Ahuja | |
| 2015/0331889 A1* | 11/2015 | Wang | G06F 3/0482 707/691 |
| 2017/0220906 A1 | 8/2017 | Bengio | |
| 2017/0262156 A1* | 9/2017 | Xing | G06F 3/033 |
| 2019/0138805 A1* | 5/2019 | Saha | G06K 9/00483 |
| 2019/0366222 A1* | 12/2019 | Yong | A63F 13/86 |

* cited by examiner

Challenge Courses

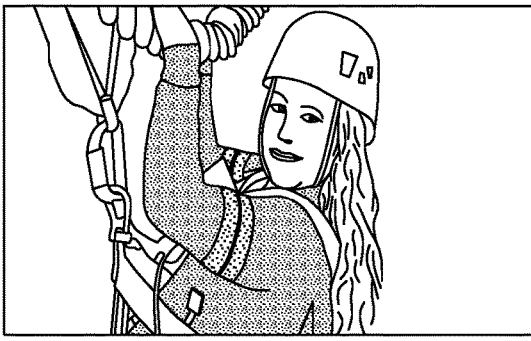

Council Approval: Required

Activity Permitted for: D B J C S A

— 302

About Challenge Courses

304

A challenge course is a set of structures that provide a setting for physical challenges designed to increase participants' self-confidence and physical coordination, to increase group cooperation, and to be fun.

Initiative games and low elements require the group to work together to accomplish mental or physical challenges; spotters safeguard the movements of each member of the group. High ropes challenge courses involve components for individual or group challenges that are six feet or more off the ground. Spotters (participants who safeguard the movements of a member of the group) provide support and protect the head and upper body of a climber in case of a fall.

Each participant must possess a physical strength and technical skills to use the equipment and understand the safety procedures and consequences of there actions. Connect with your council for suggestions and site approval.

FIG. 3A

Challenge Courses

Council Approval: Required

Activity Permitted for: D B J C S A

—302

About Challenge Courses

304

A challenge course is a set of structures that provide a setting for physical challenges designed to increase participants' self-confidence and physical coordination, to increase group cooperation, and to be fun.

—310—

Initiative games and low elements require the group to work together to accomplish mental or physical challenges; spotters safeguard the movements of each member of the group. High ropes challenge courses involve components for individual or group challenges that are six feet or more off the ground. Spotters (participants who safeguard the movements of a member of the group) provide support and protect the head and upper body of a climber in case of a fall.

Each participant must possess a physical strength and technical skills to use the equipment and understand the safety procedures and consequences of there actions. Connect with your council for suggestions and site approval.

FIG. 3B

ALIGNING UNLABELED IMAGES TO SURROUNDING TEXT

BACKGROUND OF THE INVENTION

The present invention relates generally to the field of imagery annotation and more particularly to aligning text of a document with an image of the document.

Unlabeled data is a designation for pieces of data that have not been tagged with labels identifying characteristics, properties or classifications. Unlabeled data is typically used in various forms of machine learning. Because the data does not have labels, the machine learning program has to identify each data piece using properties and characteristics of each data piece.

Visual recognition uses deep learning algorithms to analyze images for scenes, objects, and other content. Visual recognition deals with how computers can be made to gain high-level understanding from digital images or videos. Also, visual recognition is concerned with the automatic extraction, analysis and understanding of useful information from a single image or a sequence of images.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for extracting information of an unlabeled image within a document and aligning the information to text of the document. The method includes one or more processors identifying an image that is not associated with a corresponding label in a document that includes text. The method further includes one or more processors determining a feature of an object of the image. The method further includes one or more processors identifying an alignment candidate of the text of the document based at least in part on the feature of the object, wherein the alignment candidate is a segment of the text of the document identified as corresponding to the feature of the object. The method further includes one or more processors aligning the feature with the alignment candidate of the text of the document.

BRIEF DESCRIPTION OF THE DRAWINGS

FIG. 3A is an example depiction of an unclassified document that includes unlabeled images, in accordance with embodiments of the present invention.

FIG. 3B is an example depiction of an unclassified document that includes unlabeled images subsequent to alignment program 200 identifying alignment candidates, in accordance with embodiments of the present invention.

DETAILED DESCRIPTION

Embodiments of the present invention allow for extracting information of an unlabeled image within a document and aligning the information to text of the document. Embodiments of the present invention determine a plurality of features of an unlabeled image of a document. Embodiments of the present invention identify portions of text of a document that are related to the determined features of an unlabeled image of the document. Additional embodiments of the present invention rank identified text relationships and align text to determined features of an unlabeled image of a document.

Some embodiments of the present invention recognize that challenges exist in aligning information of unlabeled images of a document to text surrounding the unlabeled images. Thus, a user must acquire training data that includes documents with labels, which can be costly, or manually tag unlabeled documents, which can be time consuming. Various embodiments of the present invention resolve these problems utilizing visual recognition techniques to determine unique characteristics of an unlabeled image in a document and rank correlation between the unique characteristics and text of the document to align the unique characteristics with the text of the document.

Embodiments of the present invention can operate to increase computing resource by reducing the number of tasks corresponding to tagging unlabeled data of a document that a computing system must perform. Additionally, various embodiments of the present invention can automatically update image captions/references, which improves accessibility of a document. Furthermore, various embodiments of the present invention improve search capabilities of a document by using visual recognition techniques and fuzzy matching to generate metadata that is aligned with relevant text of the document.

Implementation of embodiments of the invention may take a variety of forms, and exemplary implementation details are discussed subsequently with reference to the Figures.

Figure 1:
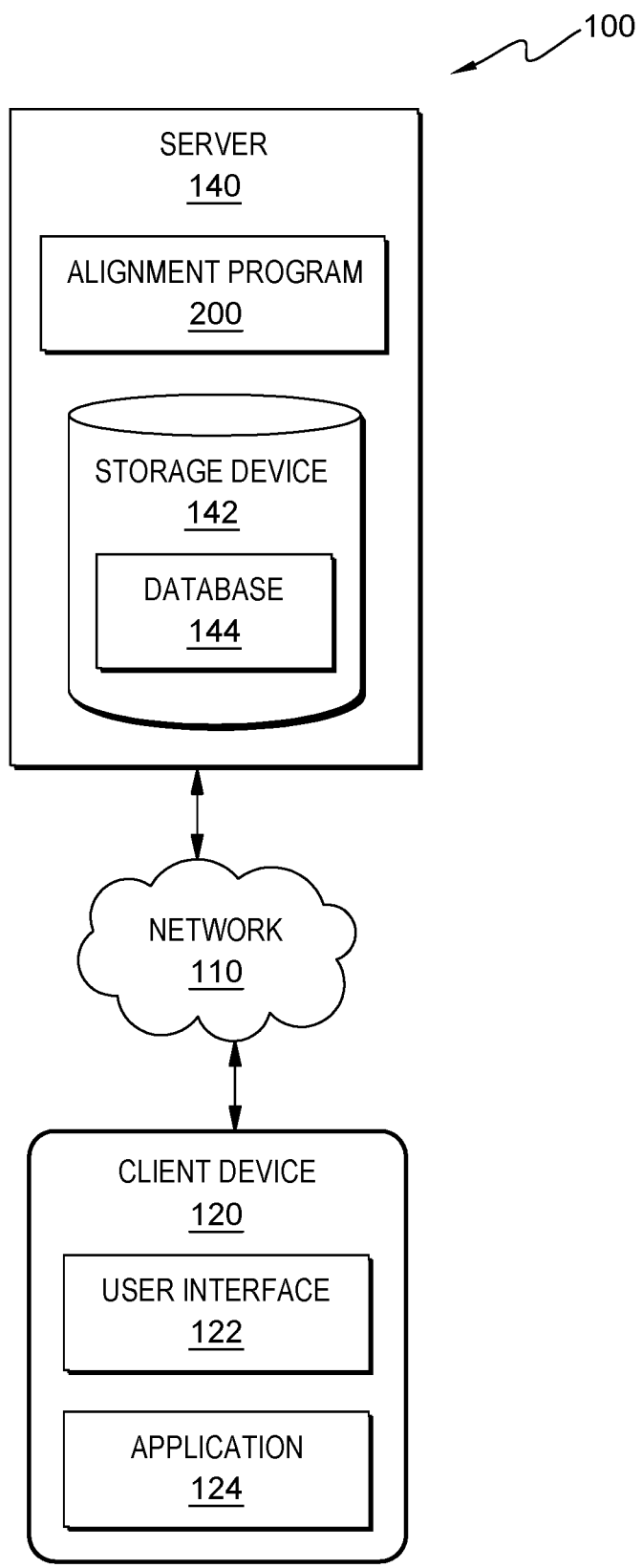
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Alignment program 200 enables the authorized and secure processing of personal data. Alignment program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Alignment program 200 provides information regarding personal data and the nature (e.g., type, scope, purpose, duration, etc.) of the processing. Alignment program 200 provides the user with copies of stored personal data. Alignment program 200 allows the correction or completion of incorrect or incomplete personal data. Alignment program 200 allows the immediate deletion of personal data.

Distributed data processing environment 100 includes server 140 and client device 120, all interconnected over network 102. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, client device 120, and other computing devices (not shown) within distributed data processing environment 100.

Client device 120 can be one or more of a laptop computer, a tablet computer, a smart phone, smart watch, a smart speaker, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 may include one or more a processor, user interface 122, and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and alignment program 200. Storage device 142 can be implemented with any type of storage device, for example, persistent storage 405, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores a plurality of information, such as database 144. Database 144 may represent one or more organized collections of data stored and accessed from server 140. For example, database 144 includes documents, unlabeled images of a document, metadata of unlabeled images, and/or alignment candidates of a document. In one embodiment, data processing environment 100 can include additional servers (not shown) that host additional information that accessible via network 110.

Generally, alignment program 200 utilizes visual recognition techniques and machine learning algorithms to align information of an unlabeled image of a document with text of the document. In various embodiments of the present invention, alignment program 200 may be implemented in numerous means that can aid users with visual impairments and/or text analysis.

In one embodiment, alignment program 200 determines a feature of a document of client device 120. For example, alignment program 200 receives an unclassified document (e.g., includes images that do not include captions or notations) from a browser (e.g., application 124) of a computing device (e.g., client device 120) of a user. In this example, alignment program 200 uses computer vision and image processing techniques (e.g., object detection) to detect instances of semantic objects in unlabeled images of the unclassified document. Additionally, alignment program 200 classifies each instance of the semantic objects detected in an unlabeled image of the unclassified document. Moreover, alignment program 200 extracts information (e.g., unique characteristics, metadata, labels, etc.) from the classifications of the semantic objects. Furthermore, alignment program 200 stores the classified semantic object and extracted information in a database (e.g., database 144) associated with the unclassified document.

In another embodiment, alignment program 200 correlates a feature of an unlabeled image of a document of database 144 with textual data of the document. For example, alignment program 200 uses a fuzzy text search (e.g., approximate string-matching algorithm) to correlate words (e.g., strings of characters) of text of an unclassified document with information of a semantic object of an unlabeled image of the unclassified document. In this example, alignment program 200 ranks one or more correlations of the words and the information of the semantic object of the image. In another embodiment, alignment program 200 aligns textual data of a document of database 144 with a feature of an unlabeled image of the document. For example, alignment program 200 adds a hyperlink/link between information of a semantic object of an unlabeled image and a feature of the unlabeled image of the document.

Figure 2:
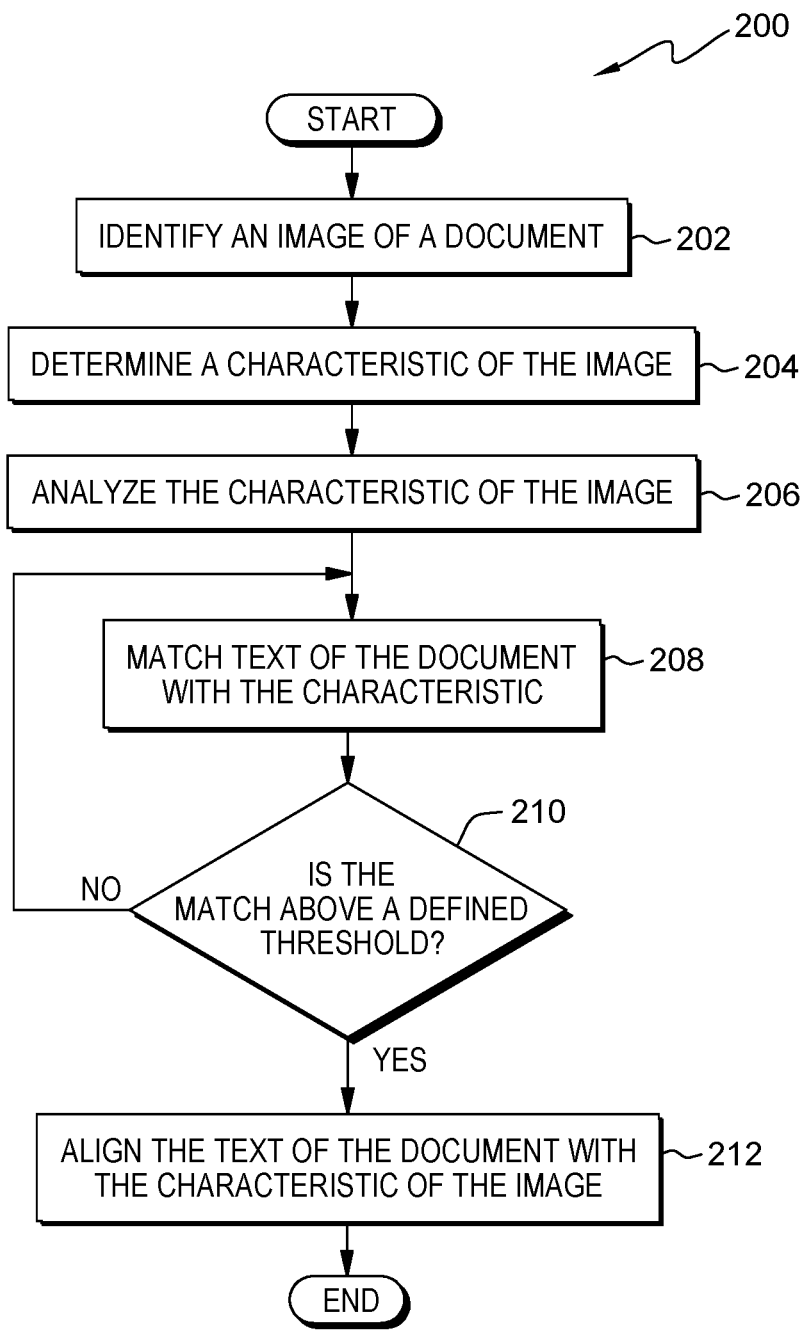
FIG. 2 is a flowchart depicting operational steps of a program, within the data processing environment of FIG. 1, for extracting information of an unlabeled image within a document and aligning the information to text of the document, in accordance with embodiments of the present invention.

FIG. 2 is a flowchart depicting operational steps of alignment program 200, a program for extracting information of an unlabeled image within a document and aligning the information to text of the document, in accordance with embodiments of the present invention. In one embodiment, alignment program 200 initiates in response to client device 120 retrieving a document. For example, alignment program 200 initiates when a computing device (e.g., client device 120) retrieves a document to display to a user. In another embodiment, alignment program 200 is continuously monitoring client device 120. For example, alignment program 200 monitors a computing device (e.g., client device 120) of a user after a user registers the computing device alignment program 200, based on user-provided preferences.

In step 202, alignment program 200 identifies an image of a document. In various embodiments of the present invention, alignment program 200 utilizes various computer vision techniques to identify images in an unclassified document (e.g., images within the document have no captions, links, labels, tags, notations, etc.). In one embodiment, alignment program 200 identifies an unlabeled object in a document of database 144. For example, alignment program 200 uses object detection techniques to detect an unlabeled image of an unclassified document. In this example, alignment program 200 utilizes a trained machine learning model, which may be trained using a support vector machine (SVM), to detect the unlabeled image of the unclassified document (e.g., images, text, etc.).

Additionally, alignment program 200 can analyze the unclassified document and determine that the unclassified document includes one or more unlabeled images. In another example, alignment program 200 may utilize a deep learning approach (e.g., convolutional neural networks) to identify an unlabeled image of an unclassified document. In another embodiment, alignment program 200 identifies an unlabeled image in a document of application 124 of client device 120. For example, alignment program 200 identifies one or more unlabeled images in an unclassified document displayed on a web browser (e.g., application 124) of a computing device of a user.

FIG. 3A depicts document 300, which is an example of an unclassified document that includes unlabeled images. Document 300 includes image 302 and image 304. Image 302 is a depiction of an unlabeled image of document 300. Image 304 is a depiction of an unlabeled image of document 300 that includes text. In an example embodiment, alignment program 200 utilizes edge detection (e.g., object detection) to detect respective areas within document 300 that correspond to image 302 and image 304.

In step 204, alignment program 200 determines a characteristic of the image. In various embodiments of the present invention, alignment program 200 utilizes visual recognition techniques to determine features of objects of unlabeled images in an unclassified document. In one embodiment, alignment program 200 determines features of an object in an image of a document of database 144. For example, alignment program 200 uses object recognition techniques to identify one or more features (e.g., scenes, objects, faces, text, other content, etc.) of an unlabeled image in an unclassified document. Alignment program 200 can then return keywords that provide information about the feature of the unlabeled image (i.e., generates metadata). In this example, alignment program 200 utilizes a trained machine learning model, which may be trained using a support vector machine (SVM), to identify the one or more features of the unlabeled image. Additionally, alignment program 200 identifies attributes (e.g., unique characteristics, visual qualities of objects, etc.) of the unlabeled image and utilizes the attributes to determine a classification (e.g., humans, buildings, equipment, jewelry, colors, etc.) for the one or more features of the unlabeled image.

In an example embodiment, alignment program 200 utilizes an object detection model (e.g., visual recognition) to classify features of image 302. Alignment program 200 detects a plurality of objects in image 302 and classifies each of the objects of image 302. In this example, alignment program 200 determines that image 302 includes a person, helmet, tree, rope, harness, etc.

In step 206, alignment program 200 analyzes the characteristic of the image. In various embodiments of the present invention, a machine learning model may return multiple classifications and/or keywords for a feature detected in an unlabeled image. In one embodiment, alignment program 200 identifies data associated with a classification of a feature of an unlabeled image of a document of database 144. For example, alignment program 200 identifies one or more classifications and keywords corresponding to a feature of an unlabeled image of an unclassified document. In this example, alignment program 200 extracts textual data corresponding to a classification (e.g., class, keywords, etc.) of the feature of the unlabeled image. Additionally, alignment program 200 performs shallow parsing on the extracted textual data (e.g., metadata) to identify noun phrases, adjective phrases, and additional classifications of the feature that the machine learning model generates in association with assigning a classification to the feature. Furthermore, alignment program 200 extracts the identified metadata (e.g., classification, nouns, adjectives, keywords, etc.) of the feature of the image and stores the identified metadata in a database (e.g., database 144).

In step 208, alignment program 200 matches text of the document with the characteristic. In various embodiments of the present invention, alignment program 200 utilizes a fuzzy text search technique, which is a process that locates text (e.g., words) that are likely to be relevant to a search argument (e.g., feature classifications) even when the search argument does not exactly correspond to the desired information, to return a list of words of the text based on likely relevance, where highly relevant matches appear near the top of the list and subjective relevance ratings (e.g., percentages) may be given. In one embodiment, alignment program 200 utilizes approximate string matching to identify text segments of a document of database 144 that correspond to a classification of a feature of an object of an unlabeled image.

For example, alignment program 200 uses identified metadata of a feature of an unlabeled image of an unclassified document and approximate string matching (e.g., fuzzy text search) to identify text segments of the unclassified document that are relevant to the feature of the unlabeled image. In this example, alignment program 200 uses a classification of the feature of the unlabeled image to identify text segments of the unclassified documents that are associated with the classification. Additionally, alignment program 200 can consider text segments relevant to the classification based on various factors (e.g., keywords, topics, paragraph alignment, etc.) as well as, synonyms of classifications and related terms within a domain of a particular subject matter (e.g., safety, health, customer service, etc.). Also, alignment program 200 stores alignment candidates (e.g., identified text segments) in a database. Generally, fuzzy text search returns irrelevant hits as well as relevant hits, and superfluous results are likely to occur for terms with multiple meanings.

FIG. 3B depicts document 300, which is an example of an unclassified document that includes image 302 and image 304, subsequent to alignment program 200 identifying text segments of image 304. Image 302 is a depiction of an unlabeled image of document 300. Image 304 is a depiction of an unlabeled image of document 300 that includes text. Alignment candidates 310 are examples of text segments of image 304 identified as possible matches for features of image 302. In an example embodiment, alignment program 200 performs a fuzzy text search (e.g., approximate string matching) using classifications (e.g., helmet, rope, tree, harness, etc.) and/or keywords (e.g., forest, belay, platform, etc.) to identify alignment candidates 310 of image 304.

In decision step 210, alignment program 200 determines whether the match is above a defined threshold. Generally, a semantic similarity is a metric defined over a set of documents or terms, where the idea of distance between the set of documents or terms is based on the likeness of meaning or semantic content. Semantic similarity can be estimated by defining a topological similarity, by using ontologies to define the distance between terms/concepts. In one embodiment, alignment program 200 utilizes natural language understanding (NLU) to determine whether a match of an identified text segment of a document of database 144 and a classification of a feature of an identified object of the document is above a defined threshold.

For example, alignment program 200 determines a score for an alignment candidate based on a semantic similarity to extracted metadata (e.g., classifications) of an unlabeled image of an unclassified document. Additionally, alignment program 200 extracts semantic features (e.g., context, concepts, etc.) from an identified text segment (e.g., alignment candidates) and determines whether the semantic features of the identified text segment corresponds to a concept of the extracted metadata, where a percentile above the mean of 0.5 on a scale of negative one (−1) to one (1) for a particular concept of the identified text segment indicates a match where a score of one (1) signifies extremely high similarity. In this example, alignment program 200 utilizes ontologies to define the distance between the extracted semantic features of the identified text segment of alignment candidates to assign the score to the identified text segment. In another example, alignment program 200 can rank alignment candidates based on a determined percentile from highest to lowest, where a higher percentile score on a scale of negative one (−1) to one (1) indicates a closer correlation between extracted metadata and an alignment candidate.

If alignment program 200 determines that a match of an identified text segment of an unclassified document of database 144 and a classification of a feature of an unlabeled image of the unclassified document is not above a defined threshold (decision step 210, "NO" branch), then alignment program 200 identifies one or more text segments of the unclassified document of database 144 that correspond to the classification of the feature of the unlabeled image of the unclassified document. For example, in response to alignment program 200 determining that an alignment candidate has a score of 0.4, which is less than a defined threshold of 0.5, alignment program 200 returns to step 208 to identify text segments in an unclassified document.

If alignment program 200 determines that a match of an identified text segment of a document of database 144 and a classification of a feature of an unlabeled image of the document is above a defined threshold (decision step 210, "YES" branch), then alignment program 200 compares a score of the match to a score of one or more matches. For example, alignment program 200 determines that an alignment candidate has a score of 0.6, which is greater than a defined threshold of 0.5. Additionally, alignment program 200 orders the alignment candidate with respect to one or more alignment candidates based on determined scores (i.e., arranges the alignment candidates in relation to other alignment candidates according to a value of an assigned score).

In step 212, alignment program 200 aligns the text of the document with the characteristic of the image. In one embodiment, alignment program 200 annotates an identified text segment of a document of database 144 with a classification of a feature of an identified object of the document. For example, alignment program 200 adds a hyperlink to an alignment candidate of an unclassified document that initiates display of metadata (e.g., classifications) corresponding to image characteristics of an image. In this example, alignment program 200 adds hyperlinks to text (e.g., words, sentence, paragraphs, etc.) of the unclassified document. In another example, alignment program 200 modifies metadata associated with text of an unclassified document to include determined classification of an image of the unclassified document.

Figure 3C:
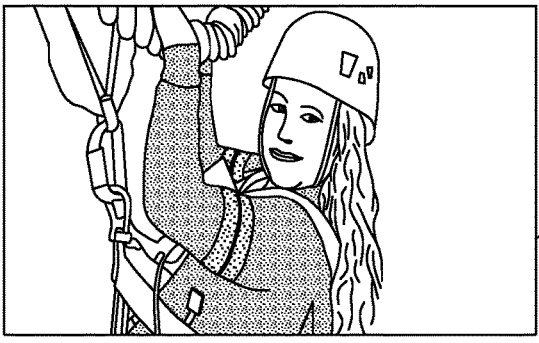
FIG. 3C is an example depiction of an unclassified document that includes unlabeled images subsequent to alignment program 200 annotating text with alignment candidates, in accordance with embodiments of the present invention.

FIG. 3C depicts document 300, which is an example of an unclassified document that includes image 302 and image 304 subsequent to alignment program 200 annotating text with alignment candidates 310 in image 304. Image 302 is a depiction of an unlabeled image of document 300. Image 304 is a depiction of an unlabeled image of document 300 that includes text. Annotations 320 are particular points in document 300 that include extracted metadata of image 302 that is associated with a subset of alignment candidates 310.

In an example embodiment, responsive to alignment program 200 determining that a match of extracted metadata of image 302 and one or more text segments of alignment candidates 310 is above a defined threshold, alignment program 200 adds annotations 320 to an x-y coordinate of document 300 that corresponds with the identified alignment candidates 310. In this example embodiment, an annotation can be a link (e.g., hypertext, mouseover, hyperlink, etc.) that includes the extracted metadata of image 302. Additionally, alignment program 200 enables a graphical control element that is activated when a user moves or hovers the pointer over a trigger area (e.g., the x-y coordinates of the identified alignment candidates 310) that displays the extracted metadata of image 302 that corresponds to the trigger area.

Figure 4:
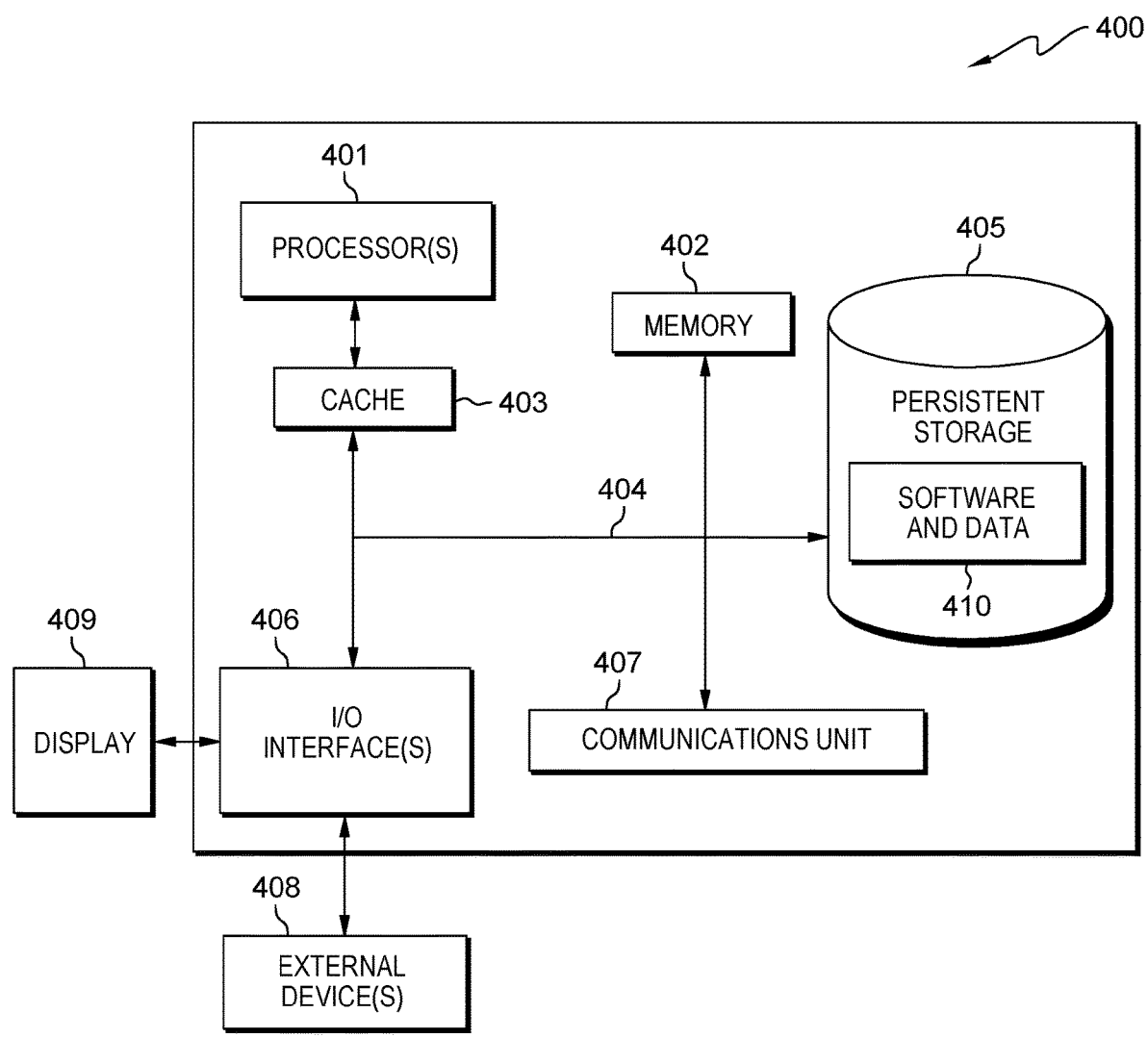
FIG. 4 is a block diagram of components of the client device and server of FIG. 1, in accordance with an embodiment of the present invention.

FIG. 4 depicts a block diagram of components of client device 120 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to server 140, software and data 410 includes data of storage device 142, database 144, and alignment program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

identifying, by one or more processors, an image that is not associated with a corresponding label in a document that includes text;

determining using visual recognition, by one or more processors, a feature of an object recognized in the image, wherein the object recognized is among a plurality of other recognizable objects, and each of the recognizable objects have been assigned one or more of a plurality of classifications;

extracting text metadata from the one or more classifications assigned to the recognized object that is associated with the feature;

identifying, by one or more processors, an alignment candidate of the text of the document based at least in part on the extracted text metadata, wherein the alignment candidate is a segment of the text of the document identified to correspond to the extracted text metadata through string matching;

aligning, by one or more processors, the feature with the alignment candidate of the text of the document, wherein aligning the feature with the alignment candidate further comprises:

annotating, by one or more processors, an x-y coordinate of the document corresponding to the alignment candidate of the text to include the extracted text metadata; and displaying, by the one or more computer processors, the extracted text metadata in response to a user moving a pointer over the x-y coordinate.

2. The method of claim 1, further comprising:

determining, by one or more processors, that a score of the alignment candidate is above a defined threshold score; and ranking, by one or more processors, the score of the alignment candidate with a plurality of alignment candidates of the text of the document.

3. The method of claim 1, wherein determining the feature of the object of the image, further comprises:

detecting, by one or more processors, the feature in the object of the image included in the document; and identifying, by one or more processors, an attribute of the feature of the object of the image, wherein the attribute is a characteristic of the object.

4. The method of claim 3, further comprising:

determining, by one or more processors, a classification of the feature of the object; and extracting, by one or more processors, metadata of the classification of the feature, wherein the metadata includes textual data that represents classes and keywords of the classification.

5. The method of claim 4, wherein identifying the alignment candidate of the text of the document based at least in part on the feature of the object, further comprises:

extracting, by one or more processors, the textual data of the metadata of the classification;

performing, by one or more processors, a fuzzy text search based at least in part on the extracted textual data of metadata of the classification; and identifying, by one or more processors, one or more alignment candidates in text of the document that correspond with the extracted textual data of the metadata of the classification of the feature.

6. The method of claim 5, wherein aligning the feature with the alignment candidate of the text of the document, further comprises:

modifying, by one or more processors, the alignment candidate of the text of the document to include a link, wherein the link includes the feature and the metadata of the classification.

7. The method of claim 1, wherein determining the score of the alignment candidate, further comprises:

determining, by one or more processors, a semantic similarity of the alignment candidate and the feature of the object; and assigning, by one or more processors, the score to the alignment candidate, wherein the assigned score is based at least in part on a defined distance between concepts.

8. A computer program product comprising:

one or more computer readable storage media and program instructions stored on the one or more computer readable storage media, the program instructions, when executed by one or more processors, cause the one or more processors to:

identify an image that is not associated with a corresponding label in a document that includes text;

determine using visual recognition, a feature of an object recognized in the image, wherein the object recognized is among a plurality of other recognizable objects, and each of the recognizable objects have been assigned one or more of a plurality of classifications;

extract text metadata from the one or more classifications assigned to the recognized object that is associated with the feature;

identify an alignment candidate of the text of the document based at least in part on the extracted text metadata, wherein the alignment candidate is a segment of the text of the document identified to correspond to the extracted text metadata through string matching;

align the feature with the alignment candidate of the text of the document, wherein aligning the feature with the alignment candidate further comprises:

annotating an x-y coordinate of the document corresponding to the alignment candidate of the text to include the extracted text metadata; and displaying the extracted text metadata in response to a user moving a pointer over the x-y coordinate.

9. The computer program product of claim 8, further comprising program instructions, stored on the one or more computer readable storage media which, when executed by the at least one of the one or more processors, causes the one or more processors to:

determine that a score of the alignment candidate is above a defined threshold score; and rank the score of the alignment candidate with a plurality of alignment candidates of the text of the document.

10. The computer program product of claim 8, further comprising program instructions, stored on the one or more computer readable storage media which, when executed by the at least one of the one or more processors, causes the one or more processors to determine the feature of the object of the image by:

detecting the feature in the object of the image included in the document; and identifying an attribute of the feature of the object of the image, wherein the attribute is a characteristic of the object.

11. The computer program product of claim 10, further comprising program instructions, stored on the one or more computer readable storage media which, when executed by the at least one of the one or more processors, causes the one or more processors, to:

determine a classification of the feature of the object; and extract metadata of the classification of the feature, wherein the metadata includes textual data that represents classes and keywords of the classification.

12. The computer program product of claim 11, further comprising program instructions, stored on the one or more computer readable storage media which, when executed by the at least one or more processors, causes the one or more processors to identify the alignment candidate of the text of the document based at least in part on the feature of the object by:

extracting the textual data of the metadata of the classification;

performing a fuzzy text search based at least in part on the extracted textual data of metadata of the classification; and identifying one or more alignment candidates in text of the document that correspond with the extracted textual data of the metadata of the classification of the feature.

13. The computer program product of claim 12, further comprising program instructions, stored on the one or more computer readable storage media which, when executed by the at least one or more processors, causes the one or more processors to align the feature with the alignment candidate of the text of the document by:
modifying the alignment candidate of the text of the document to include a link, wherein the link includes the feature and the metadata of the classification.

14. The computer program product of claim 8, further comprising program instructions, stored on the one or more computer readable storage media which, when executed by the at least one or more processors, causes the one or more processors to determine the score of the alignment candidate by:
determining a semantic similarity of the alignment candidate and the feature of the object; and
assigning the score to the alignment candidate, wherein the assigned score is based at least in part on a defined distance between concepts.

15. A computer system comprising:
one or more computer processors;
one or more computer readable storage media; and
program instructions stored on the computer readable storage media which when executed by at least one of the one or more processors:
identify an image that is not associated with a corresponding label in a document that includes text;
determine using visual recognition, a feature of an object recognized in the image, wherein the object recognized is among a plurality of other recognizable objects, and each of the recognizable objects have been assigned one or more of a plurality of classifications;
extract text metadata from the one or more classifications assigned to the recognized object that is associated with the feature;
identify an alignment candidate of the text of the document based at least in part on the extracted text metadata, wherein the alignment candidate is a segment of the text of the document identified to correspond to the extracted text metadata through string matching;
align the feature with the alignment candidate of the text of the document, wherein aligning the feature with the alignment candidate further comprises:
annotating an x-y coordinate of the document corresponding to the alignment candidate of the text to include the extracted text metadata; and
displaying the extracted text metadata in response to a user moving a pointer over the x-y coordinate.

16. The computer system of claim 15, further comprising program instructions, stored on the one or more computer readable storage media, which, when executed by at least one of the one or more processors:
determine that a score of the alignment candidate is above a defined threshold score; and
rank the score of the alignment candidate with a plurality of alignment candidates of the text of the document.

17. The computer system of claim 15, wherein program instructions, stored on the one or more computer readable storage media, to determine the feature of the object of the image, which, when executed by at least one of the one or more processors:
detect the feature in the object of the image included in the document; and
identify an attribute of the feature of the object of the image, wherein the attribute is a characteristic of the object.

18. The computer system of claim 17, further comprising program instructions, stored on the one or more computer readable storage, which, when executed by at least one of the one or more processors:
determine a classification of the feature of the object; and
extract metadata of the classification of the feature, wherein the metadata includes textual data that represents classes and keywords of the classification.

19. The computer system of claim 18, wherein program instructions, stored on the one or more computer readable storage media, to identify the alignment candidate of the text of the document based at least in part on the feature of the object, which, when executed by at least one of the one or more processors:
extract the textual data of the metadata of the classification;
perform a fuzzy text search based at least in part on the extracted textual data of metadata of the classification; and
identify one or more alignment candidates in text of the document that correspond with the extracted textual data of the metadata of the classification of the feature.

20. The computer system of claim 19, wherein program instructions, stored on the one or more computer readable storage media, to align the feature with the alignment candidate of the text of the document, which, when executed by at least one of the one or more processors:
modify the alignment candidate of the text of the document to include a link, wherein the link includes the feature and the metadata of the classification.

\* \* \* \* \*